United States Patent
Asakura et al.

[11] 3,767,388
[45] Oct. 23, 1973

[54] WELDING ROD FOR THE WELDING OF CHROMIUM STAINLESS STEEL

[75] Inventors: Shigetsugu Asakura; Kiyoshi Watanabe; Hiroshi Wachi, all of Hitachi; Tadashi Nemoto, Tokyo, all of Japan

[73] Assignee: Hitachi, Ltd., Tokyo, Japan

[22] Filed: Sept. 3, 1971

[21] Appl. No.: 177,660

[30] Foreign Application Priority Data
Sept. 7, 1970 Japan.................................. 45/77752

[52] U.S. Cl. ................ 75/124, 75/128 W, 75/128 T
[51] Int. Cl. ........................ C22c 39/14, C22c 39/20
[58] Field of Search ........................... 75/124, 128 T

[56] References Cited
UNITED STATES PATENTS
| | | | |
|---|---|---|---|
| 2,745,739 | 5/1956 | Phillips.............................. | 75/128 T |
| 3,251,683 | 5/1966 | Hammond......................... | 75/128 T |
| 2,801,916 | 8/1957 | Harris................................ | 75/128 T |
| 3,508,911 | 4/1970 | Riedel............................... | 75/124 |
| 3,071,460 | 1/1963 | Tanczyn............................. | 75/124 |
| 3,108,870 | 4/1963 | Brady................................ | 75/124 |
| 3,177,577 | 4/1965 | Fujimura........................... | 75/128 T |
| 3,300,347 | 1/1967 | Kasza................................ | 75/128 T |

*Primary Examiner*—Hyland Bizot
*Attorney*—Craig, Antonelli & Hill

[57] ABSTRACT

A welding rod for the welding of chromium stainless steel comprising not more than 0.07 percent by weight of C, not more than 1.0 percent by weight of Si, not more than 1.0 percent by weight of Mn and 11 – 13.5 percent by weight of Cr as essential components, said welding rod consisting of 0.02 – 0.06 percent by weight of C, 0.1 – 1 percent by weight of Si, 0.1 percent by weight of Mn, 11 – 13.5 percent by weight of Cr, 3.0 – 3.95 percent by weight of Ni, 0.3 – 0.6 percent by weight of Mo, 0.005 – 0.1 percent by weight of Al, 0.005 – 0.1 percent by weight of Ti and the remainder of Fe and impurities.

6 Claims, 1 Drawing Figure

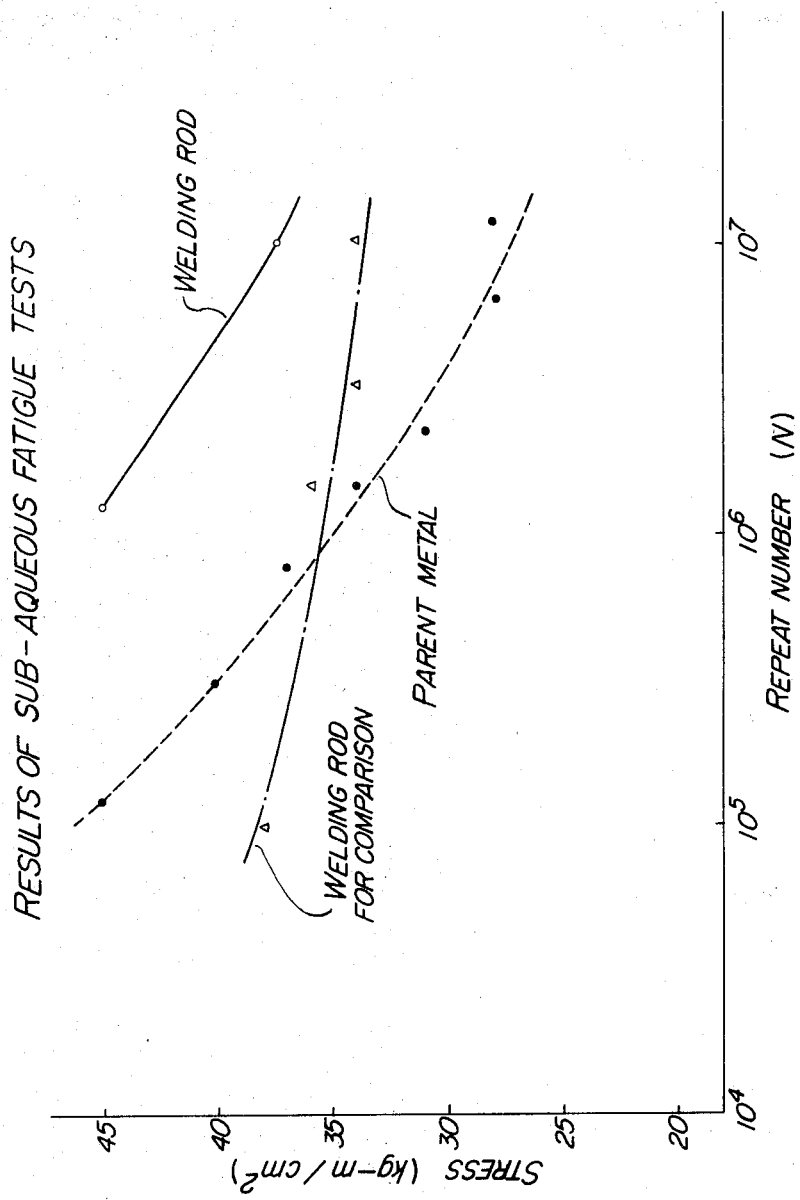

WELDING ROD FOR THE WELDING OF CHROMIUM STAINLESS STEEL

This invention relates to a welding rod for use in the welding of chromium stainless steel comprising 11 – 13.5 percent by weight of Cr.

Chromium stainless steel comprising 11 – 13.5 percent by weight of Cr has been used for various types of impellers and runners including the runners of water turbines, because of its relatively excellent resistance to cavitation.

The chromium stainless steel commonly used consists of not more than 0.07 percent by weight of C, not more than 1.0 percent by weight of Si, not more than 1.0 percent by weight of Mn, 11 – 13.5 percent by weight of Cr and the remainder of Fe and impurities.

However, the most serious shortcoming of this chromium stainless steel is that, because of the high hardenability, it is poor in weldability. Explaining this more specifically, the welding of such a chromium stainless steel is carried out by using a welding rod having the substantially same components as those of a parent metal but the deposited metal is always subjected to cracking during cooling subsequent to the welding.

The simplest method of avoidng the cracking of the deposited metal which has been commonly employed is to heat the parent metal prior to the welding. Therefore, this method is also being employed in the welding of chromium stainless steel of the type described. In this case, however, a satisfactory result cannot be obtained unless the parent metal is preheated to high temperatures ranging from 250° to 300°C. and hence there has arisen the problem that the welding operation efficiency is considerably degraded. Namely, since cracking of the chromium stainless steel and the welding rod occurs in the neighbourhood of 200°C., in order to prevent the cracking the chromium stainless steel must be heated to a temperature higher than 200°C. and this causes the welding operation efficiency to be degraded.

For enhancing the welding operation efficiency, the preheating temperature should be lowered to the possible extent, and generally attempts have been made to lower the preheating temperature to below 150°C. However, even if the preheating temperature can be lowered to such a low level, it is not easy to completely avoid the cracking of the deposited metal. Thus, it has been the most important subject in the welding of this type of chromium stainless steel to overcome such problem.

It is, therefore, an object of the present invention to provide a novel welding rod for use in the welding of chromium stainless steel, which will not cause cracking of the deposited metal even when the preheating temperature is low.

It is another object of the invention to provide a welding rod which will give a deposited metal having an improved resistance to cavitation.

It is still another object of the invention to provide a welding rod which will give a deposited metal having an improved notch toughness at normal temperature or lower temperatures.

The present invention consists in a welding rod for use in the welding of chromium stainless steel containing 11 – 13.5 percent by weight of Cr.

The welding rod according to the present invention is characterized by the fact that it consists of 0.02 – 0.06 percent by weight of C, 0.1 – 1 percent by weight of Si, 0.1 – 1 percent by weight of Mn, 11 – 13 percent by weight of Cr, 3.0 – 3.95 percent by weight of Ni, 0.3 – 0.6 percent by weight of Mo, 0.005 – 0.1 percent by weight of Al, 0.005 – 0.1 percent by weight of Ti and the remainder of Fe and impurities.

The present invention has been achieved based on the discovery that in the welding of this type of chromium stainless steel by using the conventional welding rod having the substantially same components as those of the parent metal, the cracking of the deposited metal during cooling subsequent to the welding can be avoided by incorporating a suitable quantity of Ni in said welding rod, if the chromium stainless steel is preheated to a temperature of 50° – 150°C.

The addition of Ni not only prevents the cracking of the deposited metal but also has the effect of enhancing the resistance to cavitation and increasing the mechanical strength of the deposited metal. The experiments conducted by the present inventors have revealed that the incorporation of 3.0 percent by weight or more of Ni is effective for preventing the cracking of the deposited metal when the preheating temperature of the parent metal is 150°C. or lower. The cracking preventing effect increases with the concentration of Ni increasing but the incorporation of as much as 4 percent by weight of Ni resulted in a decrease of martensite which shows high notch toughness after a post-heat treatment and an increase of residual austenite which is relatively low in toughness, and also in the formation of dendrite in the deposited metal structure causing the notch toughness of the deposited metal to be degraded. Thus, the upper limit of the Ni concentration is specified to be 3.95 percent by weight.

To increase the notch toughness of the deposited metal is highly advantageous from the practical point of view. On the other hand, the high concentration of Ni gives the fear of formation of dendrite. Al and Ti are incorporated to eliminate such fear. Namely, Al and Ti have the effect of reducing the crystal size of the deposited metal. Therefore, the deposited metal incorporating Al and Ti has a higher notch toughness than that not incorporating the same. It has been found that the concentrations of Al and Ti effective for improving the notch toughness are each in the range of 0.005 – 0.1 percent by weight and lower concentrations are substantially not effective, while higher concentrations result in the formation of ferrite in the deposited metal structure causing the notch toughness to be rather degraded. It has also been found that a particularly remarkable effect can be obtained when the concentration of Al is in the range of 0.01 – 0.05 percent by weight and that of Ti in the range of 0.04 – 0.06 percent by weight and further the sum of them is in the range of 0.02 – 0.08 percent by weight.

The welding rod of the invention comprises 0.03 – 0.6 percent by weight of Mo. After the welding, the deposited metal is subjected to a post-heat treatment to improve the residual stress created by the welding and the mechanical properties of the deposited metal. The incorporation of Mo is effective for avoiding temper brittleness. Such effect of Mo was remarkable at concentration higher than 0.3 percent by weight but the upper limit of the Mo concentration should be limited to 0.6 percent by weight because higher concentrations will adversely affect the prevention of cracking of the deposited metal.

C is necessary for imparting to the deposited metal the substantially same strength as that of the parent metal but, on the other hand, has a direct influence on the cracking and the degradation of notch toughness of the deposited metal. In the present invention, the upper limit of the C concentration is determined mainly with a view to preventing the cracking of the deposited metal, and it has been found to be 0.06 percent by weight. The lower limit of the C concentration has been determined to be 0.02 percent by weight from the strength point of view.

Si and Mn are necessary as deoxidizing agents at the time of welding. The incorporation of each of Si and Mn at a concentration of less than 0.1 percent by weight tends to result in degradation of the notch toughness of the deposited metal and impairs the welding operation efficiency, while the incorporation of the same at a concentration of higher than 1 percent by weight is rather detrimental. Preferably, the concentrations of Si and Mn are selected such that the sum of them will be in the range from 0.7 to 1 percent by weight.

Cr is necessary for imparting to the steel resistance to cavitation and its lowest concentration is 11 percent by weight. The upper limit of the Cr concentration is specified to be 13.5 percent by weight because higher concentrations will result in the formation of ferrite which degrades the toughness and weldability of the steel.

In using the welding rod of the invention, it is preferable that the parent metal contains Ni. By containing Ni in the parent metal, the susceptibility of cracking of the deposited metal can be further decreased and the impact strength thereof can be increased. The Ni concentration in the parent metal is preferably the same as that in the welding rod. It is also preferable to incorporate Mo in the parent metal in the same concentration range as that of Mo in the welding rod, for the prevention of temper brittleness of the parent metal and the heat affected zone at the time of post-heat treatment after the welding.

In the welding using the welding rod of the invention, the parent metal is preferably preheated at a temperature ranging from 50° to 150°C. because by preheating the parent metal in the temperature range specified above, the occurrence of cracks can be completely eliminated. The occurrence of cracks can also be controlled by the rate of cooling after the welding and can be avoided not only by preheating the parent metal but also by increasing the heat applied to the parent metal during the welding. It has been found that the cracking of the deposited metal can be avoided by increasing the diameter of the welding rod even when the parent metal is not preheated. This is because, as the diameter of the welding rod increases, the quantity of heat applied to the parent metal becomes larger and hence the cooling rate becomes lower, producing the same effect as that obtainable by elevating the preheating temperature. According to the experiments conducted under the optimum welding conditions at room temperature, no cracks were observed when the diameter of the welding rod was 4.0 mm or larger.

During the welding, the temperature of the parent metal between the passes should be maintained in the range from 50° to 150°C. same as the preheating temperature range. Since the Ms temperature of the welding rod according to this invention is in the neighbourhood of 200°C., a martensite structure cannot be obtained unless the parent metal is maintained at a temperature below 200°C., and hence a hard martensite can only be obtained when the parent metal is cooled to room temperature upon completion of the welding. However, when the parent metal is maintained at a temperature below the Ms temperature of the welding rod, it is converted into martensite as it is and the martensite layer thus formed is tempered by the welding heat of the following pass, so that a highly tough tempered martensite structure can be obtained and hence a deposited metal having high notch toughness can be obtained directly by the welding. The most preferable welding procedure using the welding rod of the invention comprises carrying out the welding with above-specified preheating temperature and inter-pass temperature, maintaining the parent metal temporarily at 50° – 150°C. after the welding without allowing it to cool to room temperature, heating the parent metal for a suitable period of time to elevate the temperature thereof to 580° – 650°C. and then cooling the same in air. By employing such procedure, the deposited metal is entirely tempered and converted into a martensite structure having the highest notch toughness. The temperature of the post-heat treatment is specified to be within the range from 580° to 650°C. because if the temperature is lower than 580°C., the effect of the post-heat treatment is lessened, whereas if the temperature is higher than 650°C., the deposited metal is hardened again, and the deposited metal having high notch toughness and excellent mechanical properties can be obtained in the specified temperature range.

The accompanying drawing shows the curves representing the results of sub-aqueous fatigue tests conducted on the deposited metals obtained by using the welding rod of this invention and a conventional welding rod for comparison respectively and the parent metal.

The present invention will be further described hereunder by way of example with reference to the accompanying drawing.

EXAMPLE 1

Chromium stainless steel sheets consisting of 0.05 percent by weight C, 0.55 percent by weight of Si, 0.51 percent by weight of Mn, 0.029 percent by weight of P, 0.009 percent by weight of S, 3.53 percent by weight of Ni, 12.00 percent by weight of Cr, 0.33 percent by weight of Mo, 0.10 percent by weight of Cu and the remainder of Fe were welded by using each of the welding rods of the compositions shown in Table 1.

TABLE 1

| Welding rod No. | Chemical composition (percent by weight) | | | | | | | | | | | Diameter (mm) |
| --- | --- | --- | --- | --- | --- | --- | --- | --- | --- | --- | --- | --- |
| | C | Si | Mn | P | S | Ni | Cr | Mo | Al | Ti | Fe | |
| 1 | 0.06 | 0.36 | 0.37 | 0.005 | 0.011 | 3.70 | 12.01 | 0.46 | 0.013 | 0.05 | Bal. | 4.0 |
| 2 | .04 | .37 | .42 | .005 | .008 | 3.31 | 11.75 | .52 | .015 | .06 | Bal. | 3.2 |
| 3 | .05 | .35 | .44 | .006 | .011 | 3.42 | 11.83 | .48 | .015 | .06 | Bal. | 4.0 |
| 4 | .04 | .36 | .46 | .006 | .009 | 3.36 | 11.92 | .50 | .010 | .06 | Bal. | 5.0 |

Each welding rod was produced by forging or rolling the material ingot, drawing the forged or rolled material into a wire having a diameter of 5.0 mm and cutting the wire into a length of 350 mm.

The parent metal was produced by heating the material sheet metal for 10 hours at 950°C., followed by cooling with water and tempering for 10 hours at 640°C.

The welding using the welding rods Nos. 1 and 3 was carried out under the conditions that the welding current was 140 – 150A, the arc voltage was 21 – 22V and the welding rate was 160 – 170 mm/min; the welding using the welding rod No. 2 was carried out under the conditions that the welding current was 110 – 115 A, the arc voltage was 20 – 21V and the welding rate was 140 – 150 mm/min; and the welding using the welding rod No. 3 was carried out under the conditions that the welding current was 170 – 175A, the arc voltage was 21 – 22V and the welding rate was 175 – 180 mm/min. In either case, the welding rod was used as a positive electrode. The parent metal was not preheated before the welding and after welding the parent metal sheets by forming one layer of deposited metal, the welded parent metal sheets were allowed to cool in air. As a result, the deposited metal formed by using the welding rod No. 2 having a diameter of 3.2 mm was subjected to breakage but the deposited metals formed by using the other welding rods were not subjected to breakage and did not have even micro-cracks therein.

Then, the same parent metal sheets as described above were welded after preheating them at 100°C., by using each of the welding rods Nos. 1, 2, 3 and 4 by forming one layer of deposited metal under the same conditions as set forth above. As a result, none of the deposited metals were subjected to breakage. Namely, by preheating the parent metal sheets at 100°C., the cracking of the deposited metal could be avoided regardless of the diameter of the welding rod used. When the parent metal sheets are not preheated or preheated at a temperature below 100°C., it is preferable to use a welding rod having a diameter of 4.0 mm or larger.

EXAMPLE 2

The same parent metal sheets as described in Example 1 were welded by using the welding rod No. 1 shown in Table 1 under the same conditions as in Example 1.

The welding was carried out after preheating the parent metal sheets at 100°C. by forming three layers of deposited metal while maintaining the inter-pass temperature of the parent metal sheets at 100°C. After the welding, the welded parent metal sheets were maintained at 150°C. without allowing it to cool to room temperature, following which the parent metal sheets were heated for 10 hours at 550°C., 580°C., 600°C., 620°C., 640°C. and 660°C. respectively and cooled in air.

The mechanical properties of each deposited metal are shown in Table 2.

Table 2

| Post-heat treatment temp. (°C.) | Tensile strength (kg/mm²) | Yield point (kg/mm²) | Reduction ratio (%) | Elongation (%) |
|---|---|---|---|---|
| 550 | 86.0 | 70.0 | 56.0 | 17.0 |
| 580 | 80.0 | 68.0 | 57.0 | 18.9 |
| 600 | 78.0 | 66.0 | 60.0 | 19.5 |
| 620 | 79.0 | 64.0 | 59.5 | 19.0 |
| 640 | 81.0 | 66.0 | 58.5 | 16.5 |
| 660 | 93.0 | 70.0 | 57.2 | 15.3 |

Then, the 2 mm U notch Charpy impact strengths of the deposited metal, the boundary between the deposited metal and the heat affected zone of the parent metal, and the heat affected zone of the parent metal were measured, with the results shown in Table 3.

Table 3

| Post-heat treatment temp. (°C) | 2 mm U notch Charpy impact strength (kg-m/cm²) | | |
|---|---|---|---|
| | Deposited metal | Boundary | heat affected zone |
| 550 | 7.5 | 7.4 | 16.9 |
| 580 | 9.5 | 9.6 | 19.7 |
| 600 | 9.8 | 10.0 | 20.3 |
| 620 | 9.6 | 9.8 | 20.0 |
| 640 | 9.55 | 6.6 | 19.8 |
| 660 | 7.8 | 6.0 | 17.1 |

It will be understood from Tables 2 and 3 above that a variation of the post-heat treatment temperature from 550° to 660°C. has no substantial influence on the tensile strength but has a considerable influence on the impact strength of the deposited metal, and the deposited metal which was subject to the post-heat treatment at 580° – 640°C. shows excellent mechanical properties.

EXAMPLE 3

Parent metal sheets of the same composition as those used in Example 1 were welded by forming three layers of deposited metals by using the welding rod No. 3 shown in Table 1. The welding was carried out under the conditions that the welding current was 140 – 150A, the arc voltage was 21 – 22V and the welding rate was 175 – 180 mm/min, by using the welding rod as a positive electrode. The parent metal sheets were preheated at 100°C., maintained at 100°C. during the passes, maintained at 150°C. after the welding and then subjected to a post-heat treatment at 600°C. for five hours.

For comparison, the same parent metal sheets were welded by using a welding rod consisting of 0.07 percent by weight of C, 0.47 percent by weight of Si, 0.47 percent by weight of Mn, 0.010 percent by weight of P, 0.009 percent by weight of S, 0.46 percent by weight of Ni, 11.52 percent by weight of Cr and the remainder of Fe and having a diameter of 4.0 mm, under the exactly same conditions as set forth above except that the preheating temperature was 250°C.

After the welding, each deposited metal and the parent metal were subjected to a sub-aqueous fatigue test. The sub-aqueous test was conducted by rotating the test piece while holding the opposite ends by means of chucks so as to receive a load at the mid portion thereof, and dropping water onto the test piece. The rate of rotation of the test piece was 2000 r.p.m. and the dropping rate of water was 0.3 – 0.4 l/min.

The results of the test are shown in the drawing. It was confirmed that the deposited metal formed by the welding rod of the invention shows a fatigue strength on the order of 37 kg/mm² at the rate of rotation in the neighbourhood of $10^7$ and is superior to the parent metal and the deposited metal formed by using the welding rod for comparison.

EXAMPLE 4

Parent metal sheets of the same composition as those used in Example 1 were welded by using each of the welding rods shown in Table 4, and a cracking test, an impact test and a cavitation test were conducted on each of the deposited metals.

TABLE 4

| Welding rod No. | Chemical composition (percent by weight) | | | | | | | | | | |
|---|---|---|---|---|---|---|---|---|---|---|---|
| | C | Si | Mn | P | S | Ni | Cr | Mo | Al | Ti | Fe |
| 5 | 0.04 | 0.37 | 0.42 | 0.009 | 0.010 | 3.42 | 11.83 | 0.52 | 0.010 | 0.06 | Bal. |
| 6 | .07 | .35 | .50 | .009 | .007 | | 12.00 | | | | Bal. |

The welding was carried out after preheating the parent metal sheets at 100°C. by forming three layers of deposited metals under the conditions that the welding current was 140 – 150A, the arc voltage was 21 – 22V and the welding rate was 160 – 170 mm/min, while controlling the inter-pass temperature to be 100° ± 15°C.

A cracking test and an impact test were conducted immediately after the welding and a cavitation test was conducted after the welded test piece had been subjected to a post-heat treatment at 600°C. for five hours.

In the cracking test, no cracks were observed in the deposited metal formed by using the welding rod No. 5 but the deposited metal formed by using the welding rod No. 6 was highly sensitive to cracking and its crack sensitivity was as high as 97.5 percent.

Then, each deposited metal was subjed to a 2 mm U notch Charpy impact test at 0°C. The deposited metal formed by using the welding rod No. 5 showed a Charpy impact strength of 7.4 kg-m/cm$^2$ and the deposited metal formed by using the welding rod No. 6 showed a Charpy impact strength of 3.4 kg-m/cm$^2$. Namely, it was confirmed that the welding rod No. 5 has a notch toughness greater than twice that of the welding rod No. 6.

In the cavitation test, the amount of cavitation erosion of the deposited metal formed by using the welding rod No. 5 was 5.8 mg and that of the deposited metal formed by using the welding rod No. 6 was 9.3 mg, and it was confirmed that the welding rod No. 5 is superior to the welding rod No. 6 also with respect to resistance to cavitation.

What is claimed is:

1. A welding rod for use in the arc welding of chromium stainless steel comprising not more than 0.07 percent by weight of C, not more than 1.0 percent by weight of Si, not more than 1.0 percent by weight of Mn and 11 – 13.5 percent by weight of Cr as the essential components, said welding rod consisting of 0.02 – 0.06 percent by weight of C, 0.1 – 1 percent by weight of Si, 0.1 – 1 percent by weight of Mn, 11 – 13.5 percent by weight of Cr, 3.0 – 3.95 percent by weight of Ni, 0.3 – 0.6 percent by weight of Mo, 0.005 – 0.1 percent by weight of Al, 0.005 – 0.1 percent by weight of Ti and the remainder of Fe and impurities.

2. A welding rod as defined in claim 1, which has a diameter of 4.0 mm or larger.

3. A welding rod as defined in claim 1, which in the arc welding of said chromium stainless steel enables the pre-heating temperature of the chromium stainless steel to be welded to be in the range of 50°–150°C.

4. A welding rod as defined in claim 1, which in the arc welding of said chromium stainless steel enables a satisfactory arc welding to be achieved when the pre-heating temperature and the interpass temperature of the chromium stainless steel to be welded are 50°–150°C. and after welding of the welded chromium stainless steel is cooled to 50°–150°C. and subjected to a post-heat treatment at 580°–650°C.

5. A welding rod as defined in claim 1, which is used for the arc welding of chromium stainless steel comprising not more than 0.07 percent by weight of C, not more than 1.0 percent by weight of Si, not more than 1.0 percent by weight of Mn, 11 – 13.5 percent by weight of Cr, 3.0 – 3.95 percent by weight of Ni and 0.3 – 0.6 percent by weight of Mo.

6. A welding rod for use in the arc welding of chromium stainless steel comprising not more than 0.07 percent by weight of C, not more than 1.0 percent by weight of Si, not more than 1.0 percent by weight of Mn, 11 – 13.5 percent by weight of Cr, 3.0 – 3.95 percent by weight of Ni and 0.3 – 0.6 percent by weight of Mo as the essential components, said welding rod consisting of 0.02 – 0.06 percent by weight of C, 0.1 – 1 percent by weight of Si, 0.1 – 1 percent by weight of Mn, 11 – 13.5 percent by weight of Cr, 3.0 – 3.95 percent by weight of Ni, 0.3 – 0.6 percent by weight of Mo, 0.01 – 0.05 percent by weight of Al, 0.04 – 0.06 percent by weight of Ti and the remainder of Fe and impurities, the sum of Al and Ti being 0.02 – 0.08 percent by weight.

* * * * *